United States Patent [19]

Katoh et al.

[11] 4,342,790

[45] Aug. 3, 1982

[54] METHOD OF PRODUCING MINCED FISH MEAT

[75] Inventors: Naboru Katoh; Kazumiya Komatsu; Hisashi Nozaki, all of Sayama, Japan

[73] Assignee: Kibun Company Limited, Tokyo, Japan

[21] Appl. No.: 247,712

[22] Filed: Mar. 26, 1981

Related U.S. Application Data

[63] Continuation-in-part of Ser. No. 231,943, Feb. 5, 1981, Pat. No. 4,303,685, which is a continuation of Ser. No. 52,941, Jun. 28, 1979, abandoned.

[30] Foreign Application Priority Data

Dec. 12, 1978 [JP] Japan ................... 53-152705

[51] Int. Cl.³ .................. A22C 25/14; A22C 25/16
[52] U.S. Cl. .................. 426/332; 426/643; 426/479; 426/506
[58] Field of Search .................. 231/943; 52/941; 426/254, 643, 574, 332, 506, 479

[56] References Cited

U.S. PATENT DOCUMENTS

| | | | |
|---|---|---|---|
| 1,940,159 | 12/1933 | Alsberg | 426/332 |
| 3,472,300 | 10/1969 | Conrad | 426/479 |
| 3,985,903 | 10/1976 | Hasegawa | 426/574 X |
| 4,118,517 | 10/1978 | Niki et al. | 426/643 X |
| 4,172,153 | 10/1979 | Zetherström et al. | 426/643 X |

FOREIGN PATENT DOCUMENTS

661780  4/1963  Canada .................. 426/479

*Primary Examiner*—Robert A. Yoncoskie
*Attorney, Agent, or Firm*—Browdy and Neimark

[57] ABSTRACT

The present invention relates to a method of separating fish meat from bone with showering water or an aqueous solutions of alkaline salts, saccharide and/or amino acids thereon. Hitherto the fish meat has been separated from bone in the air, so that the freshness of meat has rapidly deteriorated, but the present invention can prevent such a drawback. When the boiled fish paste is produced by use of fish meat which has been prevented from the deterioration of freshness, it is possible to obtain a boiled fish paste of a higher gel strength, in other words, one of a higher quality having good tooth touch.

3 Claims, 2 Drawing Figures

METHOD OF PRODUCING MINCED FISH MEAT

CROSS REFERENCE TO RELATED APPLICATIONS

The present application is a continuation-in-part of application Ser. No. 231,943 filed Feb. 5, 1981, now U.S. Pat. No. 4,303,685, which in turn was a continuation of application Ser. No. 52,941, filed June 28, 1979, now abandoned.

FIELD OF THE INVENTION

The present invention relates to a method of preventing fish meat from deterioration, and more particularly to a method of producing minced meat of higher quality while preventing the fish meat from deterioration.

BACKGROUND OF THE INVENTION

In general, fish changes in quality immediately after their landing with gradual deterioration thereof, and particularly when they are subjected to a treatment by a pressing meat collecting machine the deterioration of freshness occurs abruptly. There is a considerable difference in the degree of deterioration depending on the sort of fish, and the stronger the deterioration is, the poorer the quality will be when produced into a boiled fish paste, and in an extreme case, there may be produced such a minced meat that can not possibly be used for making a boiled fish paste.

Even with the meat of a white meat fish such as pollack, white croaker etc. which has usually been used as a fish suitable for the boiled fish paste, if old or badly treated, it deteriorated in its quality in a moment, so that the resulting minced meat became poor in quality.

SUMMARY OF THE INVENTION

The present inventors have eagerly studied the prevention of the deterioration of fish in order to obtain a higher quality of minced fish meat, and as a result found that it is possible to prevent deterioration of quality by collecting the meat from fish with spraying water or aqueous solutions containing one or more of alkaline salts, saccharides and amino acids thereon. It has also been found that if a fish meat is bleached by means of an aqueous solution containing one or more of alkaline salts, saccharides and amino acids, the deterioration of quality can be more prevented.

DETAILED DESCRIPTION OF PREFERRED EMBODIMENTS

Figure 1:
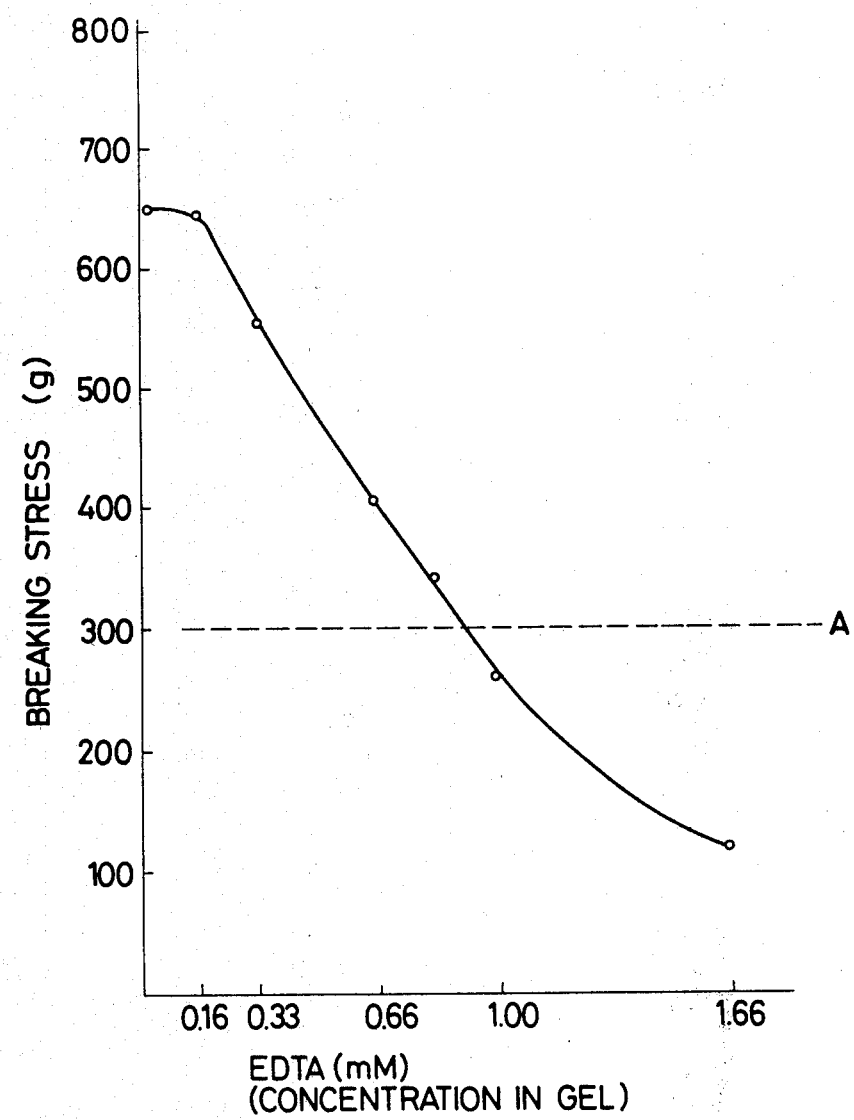
FIG. 1 is a diagram showing that breaking stress (g) decreases when the $Mg^{++}$ ATPase activity of fish meat is successively lowered with an increase in the concentration of EDTA in Experimental example 1 at the time of producing a boiled fish paste, wherein A shows a lower limit of the gel strength which permits the production of boiled fish paste.

Fish treated in accordance with the present invention are general fish. In the case of small fish, they may be used in such a condition that their internal organs and head are removed, and when it is a larger one it may be cut off into blocks and also it may be used under the shape of fillet.

These fishes are treated by a meat collecting machine, and according to the present invention, the machine must be such one that water or the aqueous solution can be always showered or injected over the meat collecting portion of the machine. In showering, water or an aqueous solution of an amount of ½ to 2 times as much as the meat portion is showered over the meat during meat collection.

As alkaline salts used in the present invention, there may be used sodium bicarbonate, sodium carbonate, disodium phosphate, sodium polyphosphate, etc., as saccharide there may be used sorbitol, dextrin, sucrose and so on, and as amino acids there may be used sodium glutamate, glycine etc.

The alkaline salts, saccharide and amino acids are used independently or in a mixture thereof. Relating to concentration, in the case of saccharide and/or amino acids, it is in a total of about 0.1–20%, preferably about in the range of 0.5–3%. Also, in the case of use of a solution of alkaline salts containing saccharide and/or amino acids, a solution prepared in such a way that an aqueous solution containing saccharide and/or amino acids in a total of 0.1–20%, preferably 0.5–3% is added with alkaline salts and adjusted to pH 7.5–8.5 is used.

The collected meat is bleached by the use of water, an alkaline salt solution, a solution of saccharide and/or amino acids, or an alkaline salt solution containing saccharide and/or amino acid.

The bleaching is carried out in such a way that, for example, the collected meat is put in a certain container and water or one of said solutions is put in said container and stirred sufficiently, and then water soluble proteins etc. are removed, and the resulting material in the container is compressed to remove water content.

After the end of the bleaching and dehydration, the resulting material is frozen and worked into minced fish meat as it is or with addition of additives such as saccharide, phosphate etc.

As described above, according to the present invention, the collecting of fish meat is carried out with spraying water, or a solution of alkaline salts, a solution of saccharide and/or amino acids, or an alkaline salt solution containing saccharide and/or amino acids, and consequently the quality deterioration of fish meat can notably be prevented.

It is a very interesting matter why the quality deterioration of the minced fish meat can be prevented by such a treatment. From the study of the inventors of the present invention, it has been thought that in the structure of fish body there are present protein, sugar and fat individually of enzyme, and when the fish body is subjected to the treatment of a pressing meat collecting machine, the cells of the fish body are broken and thereby protein, saccharide, fat, etc., contact with enzyme and due to various enzyme reactions, like a living body, enzyme reaction products, for example, lactic acid, etc., are produced in a large quantity and the decomposition of protein is caused by a proteolytic enzyme. However, the fish body is dead, so that the enzyme reaction product can not be discharged and therefore acids become stored naturally in the fish meat, with the result that the fish meat becomes deteriorated. Such a phenomenon is notable in the case of fishes of deep red-colored meat or lobsters in which the enzyme reaction is strong, and these can not be possibly a raw material for the fish paste products because after the pressing collection of meat, the meat may become deteriorated immediately and the minced fish meat falls into pieces or may dissolve.

However, it is thought that if the pressing collection of meat is carried out under the conditions of continuation of spraying water, solution of alkaline salts, saccharide and amino acids, the water and said aqueous solutions are impregnated into the broken cells, or the cells are dissolved into the water and said aqueous solutions, so that the soluble enzyme or sugar is separated from the fish meat, the enzyme or acid is diluted into below an acting concentration thereof, the acid is neutralized by an added alkali and thereby the fish meat is prevented from acidification and enzyme decomposition. Also, it is thought that amino acids and sugar are known as deterioration preventing substances of protein and thus they prevent the deterioration due to the temperature effect etc. during the operation. According to this treatment, $Mg^{++}$ ATPase activity which is an index of the quality of minced fish meat is maintained at a considerably high level, thus showing that all kinds of fish become a higher quality of minced fish meat.

The freshness of fish meat can be seen approximately exactly by measuring $Mg^{++}$ and $Ca^{++}$ ATPase activity in the fish meat. In the present invention, it is seen that $Mg^{++}$ and $Ca^{++}$ ATPase activity of the treated minced fish meat have a high activity and the freshness thereof is maintained well.

Next, some experimental examples and practical examples of the present invention will be shown, and $Mg^{++}$ and $Ca^{++}$ ATPase activity used herein are those that were measured in the following manner.

The evaluation is achieved by measuring the ATPase total activity of myofibrils prepared quantitatively from frozen minced fish meat. The quantitative method for preparation of myofibrils is as follows: Five grams of minced fish meat is homogenized in a universal homogenizer with 15 ml of 0.1 M KCl containing 40 mM borate buffer (pH 7.0) (borate buffer: 40 mM sodium tetraborate (Borax) was adjusted to pH 7.0 with hydrochloric acid.) for 1 min. at 20,000 rpm of the rotary cutter. The homogenization is repeated 5 more times of 30 sec. each. After subsequent addition of 85 ml of the same 0.1 M KCl (pH 7.0), the homogenate is centrifuged at 2,400 rpm for 10 min. The pellet from this spin is resuspended in 20 volumes of 0.1 M KCl (pH 7.0) and centrifuged for 10 min. at 2,400 rpm. The suspension and centrifugation are repeated 5 more times. The pellet obtained is finally suspended in 100 ml of 0.1 M KCl (pH 7.0) using the glass homogenizer and used for the measurement of the $Ca^{++}$ and $Mg^{++}$-ATPase total activities.

Next, relating to $Mg^{++}$ ATPase activity, 1 mM $MgCl_2$, 2 mM tris buffer solution (pH 7.5) and 1 mM ATP are allowed to react together at 25° C. for 6 min., and on the basis of an amount of the produced $P_i$ (inorganic phosphate) the activity of ATPase is measured. The activity value is expressed as below.

Specific activity=$P_i$ μmoles/min/mg protein

Total activity=$P_i$ μmoles/min/5 g of minced fish meat.

$P_i$: Inorganic phosphate.

$Ca^{++}$ ATPase: 5 g of a minced fish meat is weighed out, and this meat is added with 15 ml of 0.1 M KCl solution containing 40 mM borate buffer (pH 7.1) and homogenized, and further added with 15 ml of said solution and subjected to a centrifugal separation (600×g, 15 min.) and the resulting precipitate is added with 30 ml of 0.1 M KCl solution containing 40 mM borate buffer and 1% TRITON×100 (TRITON×100: WAKOPURE CHEMICAL INDUSTRIES LTD) liquid, and left for 15 min. as it is, thereby allowing the lipids and membrane components to dissolve. This mixture is then subjected to a centrifugal separation and the resulting precipitate is washed with said first added solution three to four times, thereby washing out the TRITON×100, and said solution of an amount of five times as much as the precipitate is added to the precipitate and this mixture is subjected to a centrifugal separation 400×g for 3 min. to collect the components in the supernatant liquid, and the resulting precipitate is again homogenized and combined with said supernatant liquid to prepare a constant volume of 100 ml.

For $Ca^{++}$ ATPase activity, 5 mM $CaCl_2$, 5 mM tris buffer solution (pH 7.0) and 1 mM ATP are allowed to react together at 25° C. for 6 min. and on the basis of an amount of the produced $P_i$, the activity of ATPase is measured. The activity value is expressed as below.

Specific activity=$P_i$ μmoles/min/mg protein

Total activity=$P_i$ μmoles/min/5 g of minced fish meat.

$P_i$: Inorganic phosphate.

Next, some experimental examples and practical examples according to the present invention will be described.

EXPERIMENTAL EXAMPLE 1

A frozen pollack minced meat was put in a cutter mixer and treated at 1500 rpm for 5 min., thereby performing agitation and cutting thereof, and thereafter the resulting paste was added with 0–1.66 mM (variable) of EDTA and subjected to an agitation-cutting treatment at 1500 rpm for 1 min. thereby causing $Mg^{++}$ of $Mg^{++}$ ATPase to be chelated so that $Mg^{++}$ ATPase activity of fish meat is progressively lowered, and the resulting paste was subjected to setting at 40° C. for 60 min. and then steam-heated at 85° C. for 30 min. to produce a boiled fish paste, and its gel strength was measured in the breaking stress (g).

The results of said measurement are shown in the graph of FIG. 1, and from this figure it is apparent that the gel strength lowers quickly with increasing the added amount of EDTA, and at a point of 1 mM EDTA the paste becomes brittle to such an extent that it can already not be used to produce a boiled fish paste, namely it becomes loose so that it can not be used for making the paste products. In the figure, A shows a lower limit of the gel strength up to which the boiled fish paste products can be produced. From the above test results, it is recognized that $Mg^{++}$ ATPase activated by $Mg^{++}$ has a strong correlation with the gelation faculty of fish meat.

EXPERIMENTAL EXAMPLE 2

Present method: After a short time after mackerel was caught, its head and internal organs were removed, and a water which was adjusted to pH 7.5 by use of sodium bicarbonate was put in a certain container and a collection of the fish meat was carried out with spraying said water on the meat collecting portion of the pressing meat collecting machine, and this meat was taken and subjected to water-bleaching three times by use of water, and then made into the minced fish meat. Using this minced fish meat, a boiled fish paste was produced in a conventional manner, and its gel strength was measured. Prior art method: After a short time after mackerel was caught, its head and internal organs were removed, and subjected to the treatment of a pressing meat collecting machine in the air to collect the meat, and the collected meat was subjected to water-bleaching three times by use of water and then made into the minced fish meat. Using this minced fish meat, a boiled fish paste was produced in a conventional manner, and its gel strength was measured.

A result of these comparison tests is shown in the following Table I.

TABLE I

| Method of treatment | Moisture content in minced fish meat | Gel strength |
|---|---|---|
| Present invention method | 76.2 | 390 |
| Prior art method | 77.5 | 160 |

EXPERIMENTAL EXAMPLE 3

Fish body of white croaker without its head and internal organs was subjected to the treatment of a meat collecting machine to collect the meat in such a way that in the case of non-addition, no solution was added, and in the present invention, a solution of 0.25% sodium bicarbonate and 1% sorbitol, and solution of 1% sodium glutamate was respectively showered during the meat collection, and at the time of the bleaching, it was carried out by use of each water, 0.5% sodium bicarbonate solution, solution of 0.25% sodium bicarbonate and 1% sorbitol and solution of 1% sodium glutamate, and in the case of making the minced fish meat, it was respectively carried out in the condition of non-addition, an addition of 5% sorbitol, 1% sodium glutamate, and phosphate and thereafter the meat was frozen, and each of frozen minced fish meats was produced.

Table II shows these experimental conditions.

TABLE II

| Experiment | At the time of meat collection | At the time of bleaching | At the time of producing minced fish meat | Water content | pH |
|---|---|---|---|---|---|
| 1. | Non-addition | Water | Non-addition | 78.9 | 6.88 |
| 2. | Non-addition | Water | 5% Sorbitol, Phosphate | 75.4 | 7.17 |
| 3. | Non-addition | 0.5% Sodium bicarbonate | 5% Sorbitol, Phosphate | 75.0 | 7.20 |
| 4. | 0.25% Sodium bicarbonate, 1% Sorbitol | 0.25% Sodium bicarbonate, 1% Sorbitol | 5% Sorbitol, Phosphate | 78.7 | 7.00 |
| 5. | 1% Glu-Na | 1% Glu-Na | 1% Glu-Na, Phosphate | 78.4 | 7.04 |
| 6. | 1% Glu-Na | 1% Glu-Na | 5% Sorbitol, Phosphate | 76.7 | 6.95 |

The obtained frozen minced fish meat was reserved for two weeks and thereafter the minced meat was thawed, and its pH, water content, $Mg^{++}$ and $Ca^{++}$ ATPase activity were measured, and also the minced meat was treated by means of a cutter mixer, and heating was carried out at 40° C. for 60 min., and steam-heated at 85° C. for 30 min. thereby producing a boiled fish paste, and its gel strength was measured in breaking stress (g).

The result is shown in the following Table III.

TABLE III

| Experiment | pH | Water content | Myofibrillar $Mg^{++}$ ATPase activity | Myofibrillar $Ca^{++}$ ATPase activity | Gel strength at 11mm (g) |
|---|---|---|---|---|---|
| 1 | 6.80 | 79.2 | 0.668 | 0.129 | 290 |
| 2 | 6.85 | 79.4 | 0.801 | 0.165 | 450 |
| 3 | 6.85 | 79.2 | 0.830 | 0.230 | 680 |
| 4 | 6.88 | 79.0 | 1.050 | 0.263 | 1000 |
| 5 | 6.90 | 78.6 | 0.855 | 0.230 | 750 |
| 6 | 6.86 | 78.6 | 0.938 | 0.229 | 960 |

Figure 2:
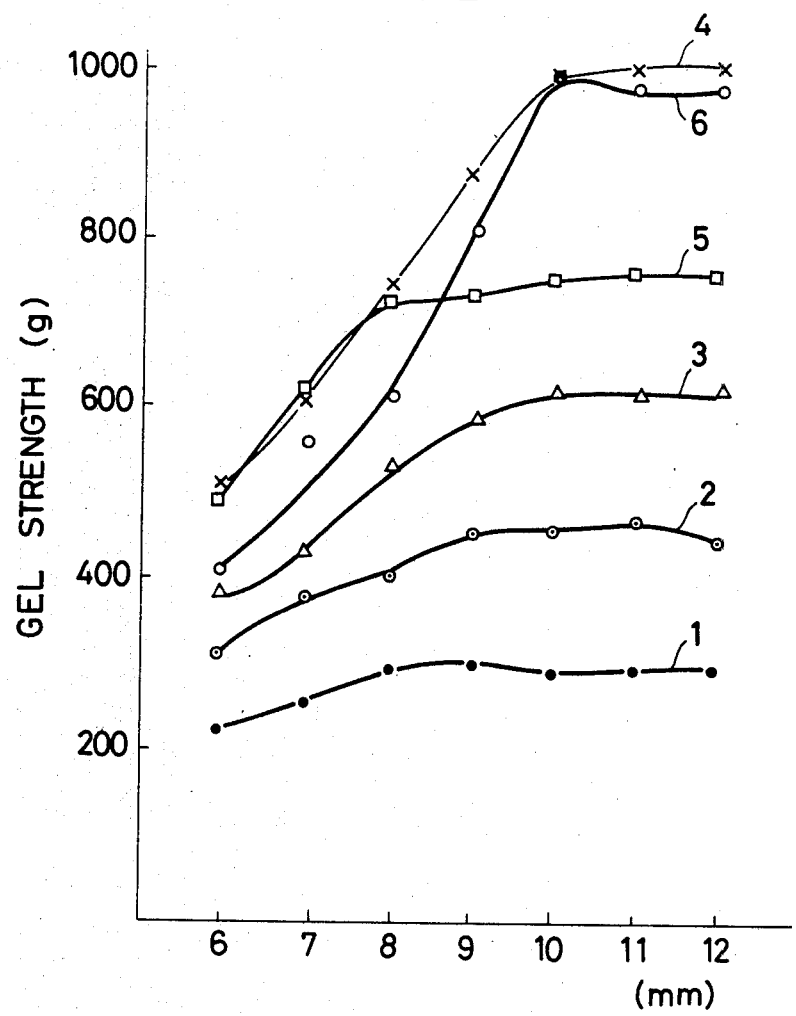
FIG. 2 is a diagram showing the change of gel strength in Experiments 1 to 6 in Experimental example 3, wherein 1 to 6 show respectively Experiments 1 to 6.

Moreover, relating to these Experiments 1–6, the gel strength was measured by use of the boiled fish paste cut off in a thickness of 13 mm on the basis of a compression displacement of 6–12 mm, and these results are shown in FIG. 2, wherein 1 to 6 show respectively Experiments 1 to 6.

As is apparent from Table III and FIG. 2, the minced fish meat according to the present invention has a higher freshness, and when made into the boiled fish paste, it has a higher gel strength, so that it makes possible to produce a superior boiled fish paste.

PRACTICAL EXAMPLE 1

Production of frozen minced fish meat from mackerel by meat collecting method under showering with water:

10 kg of mackerel (pH 5.7) after the landing on the market was left for about 1 hour in the cooled aqueous solution containing 1.5% of sodium bicarbonate (pH 7.5, 0° C.) of an amount three times as much as said material, and then in said solution its head was cut off and its body was divided into three parts. Further, said parts were subjected to the treatment of a meat collecting machine with showering water thereon to collect the meat and this meat was readjusted to pH 7.5. After leaving it for 30 min. as it was, it was subjected to the water-bleaching (three times) by use of water of an amount five times as much as the meat and after removing water from the meat the meat, was added with 4% of sugar, 4% of sorbitol and 0.2% of sodium polyphosphate, and mixed together and then quickly frozen at −70° C., thereby producing 2.6 kg of the frozen minced fish meat. This minced fish meat formed a boiled fish paste gel of good quality.

PRACTICAL EXAMPLE 2

Production of frozen minced fish meat from sardine by water-showering method:

10 kg of sardine (pH 5.7) after the landing on the market was immersed in cooled sodium bicarbonate solution pH 8.0 having a salt concentration 1.5%, and in said liquid the head was cut off and the body was divided into three parts, and further said parts were subjected to the meat collecting treatment, said liquid being showered during this meat collection, and the meat was readjusted to pH 7.5, and then subjected to water-bleaching three times by use of water of an amount five times as much as the meat, and after removing water from the meat, the meat was added with 4% of sugar, 4% of sorbitol and 0.2% of sodium polyphosphate, and mixed together, and then quickly frozen at −70° C., thereby producing 2.5 kg of the frozen minced fish meat. This minced fish meat formed a boiled fish paste gel of good quality.

PRACTICAL EXAMPLE 3

Meat collection of scorpionfish, which is one of white meat fishes, by water-showering method:

About 10 kg of scorpionfish, after the landing, was immersed in cooled water and therein the head and internal organs were removed, and then the meat collection was carried out by means of a meat collecting machine with showering cooled water, and the collected meat was subjected to water-bleaching treatment three times repeatedly, and then after removing water from the meat, the meat was added with 4% of sugar, 4% of sorbitol and 0.2% of sodium polyphosphate, and mixed together by means of a high speed agitator, and then quickly frozen at −70° C., thereby producing about 3 kg of the frozen minced fish meat. This minced fish meat had a good quality, namely both its physiological activity and gel strength were superior to those in the prior art.

PRACTICAL EXAMPLE 4

Meat collection of carcharhinus gangeeticus by water-showering method:

About 10 kg of carcharhinus gangeeticus, which is a cartilage fish was treated in a cooled phosphate buffer solution having pH 7.5 and a salt concentration of 15% to cut off its head and remove its internal organs, and then the meat collection was carried out by means of a meat collecting machine with showering water, and the meat was readjusted to pH 7.5, and then subjected to water-bleaching treatment three times repeatedly, and then after removing water from the meat, the meat was added with 4% of sugar, 4% of sorbitol and 0.2% sodium polyphosphate and mixed together, and thereafter quickly frozen at −70° C., thereby producing about 2.5 kg of the frozen fish meat.

PRACTICAL EXAMPLE 5

White croaker was treated to cut off its head and remove its internal organs after the landing on the market, and the meat was collected by means of a meat collecting machine with showering the solution containing 0.25% of sodium bicarbonate and 1% of sorbitol, and then the meat was subjected to the bleaching three times by use of the same solution as the above of an amount five times as much as the meat, and after removing water from the meat, the meat was added with 4% of sugar, 4% of sorbitol and 0.2% of sodium polyphosphate, and mixed together and then quickly frozen at −70° C., thereby producing 2.6 kg of the frozen minced fish meat.

PRACTICAL EXAMPLE 6

Carcharhinus gangeeticus was cut into block pieces, and subjected to the treatment of a meat collecting machine which was allowed to be spread with an aqueous solution, and at the time of the meat collection, an aqueous solution containing 0.25% of sodium bicarbonate, 1% of sorbitol and 1% of sodium glutamate of the same volume as the meat portion was sufficiently showered over the meat during the meat collection. The collected meat portion was subjected to the bleaching treatment three times by use of the same aqueous solution as the above of an amount five times as much as the meat portion, and after removing water from the meat, the meat was added with 4% of sugar, 4% of sorbitol and 0.2% of sodium polyphosphate, and subjected to mixing and grinding, and then quickly frozen, thereby producing the frozen minced fish meat.

PRACTICAL EXAMPLE 7

Mackerel after the landing on the market was made into fillet, and this was subjected to the treatment of an underwater meat collecting machine with showering an solution which was composed of an aqueous solution containing 1% of sorbitol and 1% of sodium glutamate and also added with sodium bicarbonate so as to have a pH of 7.8, and the collected meat portion was subjected to the water-bleaching three times by use of the same aqueous solution adjusted to pH 7.8 of an amount five times as much as the meat portion, thereafter the meat portion was added and mixed with 4% of sugar, 4% of sorbitol and 0.2% of sodium polyphosphate, and then quickly frozen at −70° C., thereby producing the frozen minced fish meat.

What is claimed is:

1. A method of treating fish comprising separating the meat from the whole fish whose heads and organs have been removed, blocks of such fish, or fillets of such fish, while substantially avoiding rapid deterioration caused by breakdown of meat cells during meat separation by showering the fish with an aqueous solution containing 0.1–20% of at least one member selected from the group consisting of sorbitol, dextrin, sucrose, sodium glutamate, glycine, sodium bicarbonate, sodium carbonate, disodium phosphate and sodium polyphosphate.

2. A method of producing minced fish meat comprising separating the meat from the whole fish whose heads and organs have been removed, blocks of such fish, or fillets of such fish, while substantially avoiding rapid deterioration caused by breakdown of meat cells during meat separation by showering the fish with an aqueous solution containing 0.1–20% of at least one member selected from the group consisting of sorbitol, dextrin, sucrose, sodium glutamate, glycine, sodium bicarbonate, sodium carbonate, disodium phosphate and sodium polyphosphate, and then bleaching the obtained fish meat by use of an aqueous solution containing at least one member selected from the group consisting of sorbitol, dextrin, sucrose, sodium glutamate, glycine, sodium bicarbonate, sodium carbonate, disodium phosphate and sodium polyphosphate.

3. A method in accordance with one of claims 1 or 2, wherein said separating step takes place while showering an aqueous solution containing 0.5–3% of at least one of said members.

* * * * *